Jan. 5, 1937.　　　H. G. KELLOGG　　　2,067,087

VEHICLE VENTILATING WINDOW

Original Filed Oct. 30, 1933　　2 Sheets-Sheet 1

INVENTOR
Homer G. Kellogg

BY
Whittemore Hulbert Whittemore Belknap
ATTORNEYS

Jan. 5, 1937.   H. G. KELLOGG   2,067,087
VEHICLE VENTILATING WINDOW
Original Filed Oct. 30, 1933   2 Sheets-Sheet 2
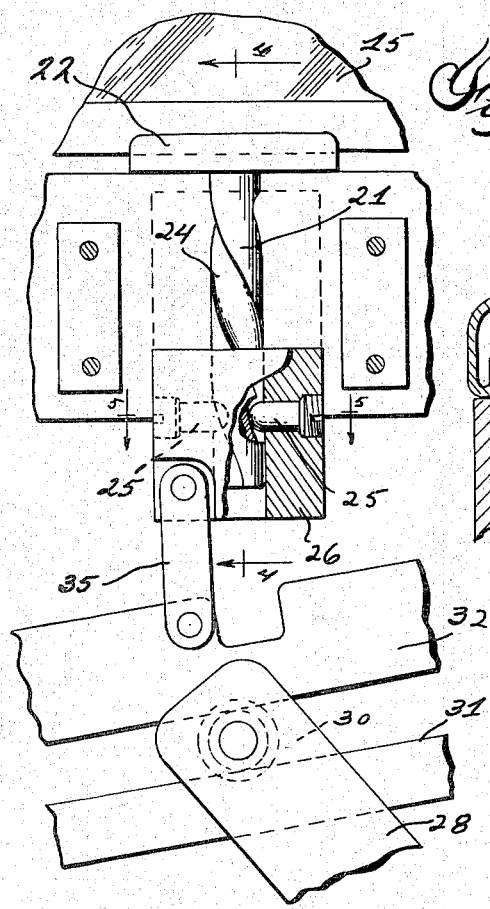
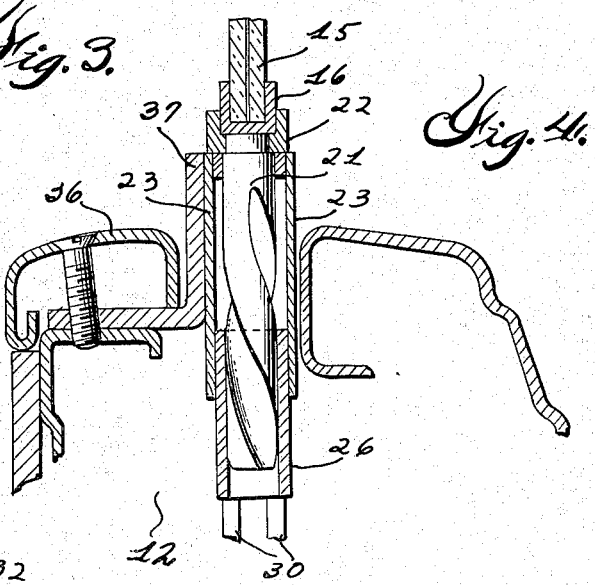
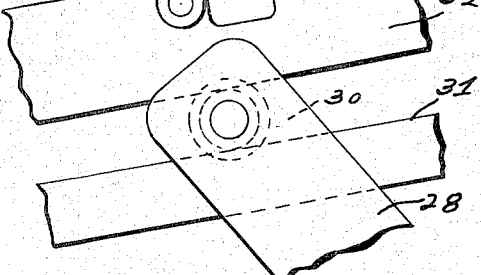
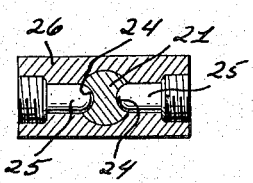
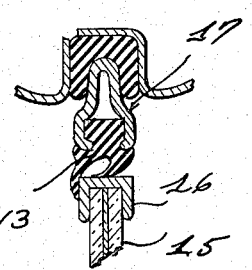
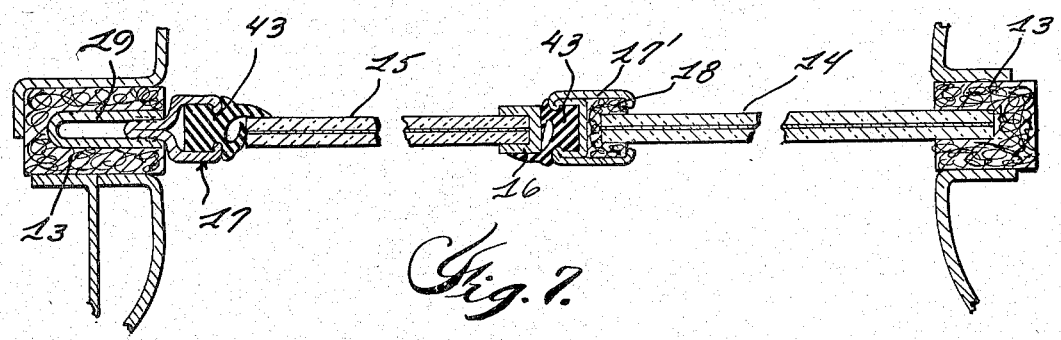
INVENTOR
Homer G. Kellogg
BY
Whittemore Hulbert Whittemore Belknap
ATTORNEYS Patented Jan. 5, 1937

2,067,087

UNITED STATES PATENT OFFICE 2,067,087

VEHICLE VENTILATING WINDOW

Homer G. Kellogg, Detroit, Mich., assignor to Motor Products Corporation, Detroit, Mich., a Corporation of New York Application October 30, 1933, Serial No. 695,903
Renewed May 29, 1936

4 Claims. (Cl. 296—44)

This invention relates to vehicle ventilating windows and more particularly to ventilating windows designed for use with the closed bodies of motor vehicles and the like.

One of the objects of the invention is to provide a window structure for closed vehicle bodies so constructed that the normal forward motion of the vehicle may be utilized to ventilate the interior of the vehicle.

Another object of the invention is to provide a ventilating window structure of this character embodying a sliding panel adapted to close a portion of the window opening, and a second panel cooperating with the sliding panel to close the window opening, said second panel being mounted for sliding movement into and out of registration with the window opening and for pivotal movement out of the plane of the window opening.

Still another object of this invention is to provide a ventilating window structure of this character having a separate window lifter mechanism for raising and lowering each of the panels, means being associated with one of the window lifter mechanisms for swinging the pivoted panel.

The invention also has as its objects to simplify, render more efficient, and improve generally constructions of this character and to this end consists in the novel details, construction and arrangement of parts, all of which will be made more apparent as this description proceeds, especially when considered in connection with the accompanying drawings wherein:

Figure 3 is an enlarged sectional elevational view of a portion of the pivoted panel operating means;

Figure 4 is a fragmentary vertical sectional view taken substantially on the plane indicated by the line 4—4 in Figure 3;

Figure 5 is a detail sectional view taken substantially on the plane indicated by the line 5—5 in Figure 3;

Figure 6 is a detail sectional view taken substantially on the plane indicated by line 6—6 of Figure 1; and Figure 7 is an enlarged sectional view, with part of the glass broken away, taken substantially on the plane indicated by line 7—7 of Figure 1.

Figure 1:
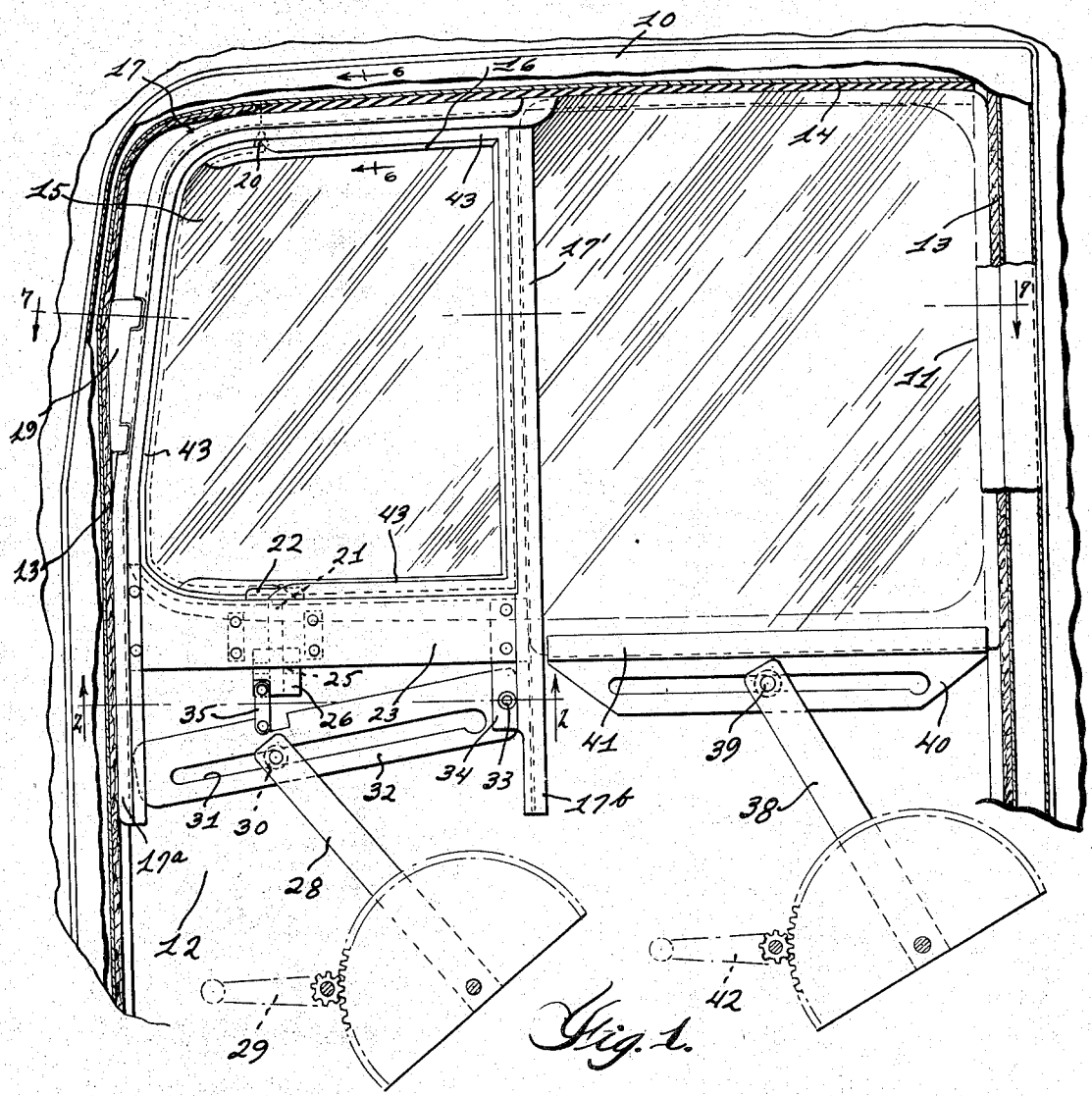
Figure 1 is a fragmentary sectional elevational view of a vehicle body provided with a window casing and opening and a ventilating window structure constructed in accordance with my invention.
Figure 2:
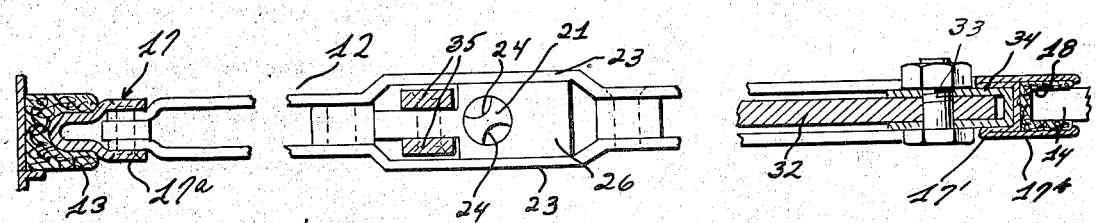
Figure 2 is an enlarged sectional elevational view taken substantially on the line 2—2 of Figure 1 looking in the direction of the arrows.

Referring now more particularly to the drawings wherein like reference characters indicate like parts, it will be noted that there is fragmentarily illustrated a portion of a vehicle door or body 10 provided with a window opening or casing 11 and a well or recess 12 arranged therebelow.

The reference character 13 indicates the usual window glass channel arranged in the casing surrounding the window opening and in which the glass for closing the window opening is adapted to slide.

In accordance with the present invention, the window opening is adapted to be closed by means of a sliding panel 14 in cooperation with a panel 15 capable of both sliding and pivotal movement.

The panel 15 is preferably, although not necessarily, provided with a frame 16 which may extend partly or completely around the glass panel 15. The panel 15 is pivotally mounted in a frame 17, one vertical side of which indicated by reference character 17' is provided with a channel 18 in which one edge of the panel 14 slides. The frame 17 is preferably provided with two downward extensions 17a and 17b, the extension 17a constituting an elongation of that portion of the frame 17 which is parallel with the vertical side 17' of the frame. This frame portion slides in the glass guide 13. If desired, a shoe 19 may be welded to the frame 17 adjacent the upper portion thereof, as illustrated, to provide lateral support for the panel in its partially lowered position. The panel 15 is pivotally mounted in the frame 17 on substantially vertically arranged pivots 20 and 21. These pivots are arranged intermediate or spaced from the vertical edges of the panel 15 so that the panel may be swung into an angular position, or out of the plane of the window opening for the purpose, for instance, of positioning the forward vertical edge inwardly of the motor vehicle and the rear vertical edge outwardly thereof.

The lower pivot 21 is in the form of a rotatably mounted shaft or screw, the upper end of which is secured to the frame 16 of the panel 15 as, for instance, by means of a channel-shaped shoe 22. This shaft 21 is journaled between a pair of spaced plates 23, the ends of which are secured to the extensions 17a and 17b of the frame 17.

The shaft 21 is formed preferably with a pair of spiral grooves or channels 24 extending from one end thereof to the other with which projections in the form preferably of blocks or inserts 25 are adapted to engage. These blocks are formed preferably of bronze and are carried in a nut or collar member 26 which is arranged for vertical sliding but non-rotatable movement between the plates 23. During this movement of the collar member 26, the engagement of the blocks 25 in the grooves 24 will cause a rotation of the shaft 21 and, as a consequence thereof, a swinging movement of the panel 15.

Vertical sliding movement is imparted to the frame 17 and consequently to the panel 15 for moving the same into registration with the window opening, and for lowering the same into the well 12, by any conventional or desired type of window lifter mechanism. In the form of lifter mechanism herein illustrated, the lifter arm is indicated by the reference character 28 and the lifter handle by the reference character 29. A pin or roller 30 of the lifter arm engages in the slot 31 of a lifting lever 32, one end of which is pivotally mounted as at 33 to a bearing plate 34 fixed to the plates 23. The other end of this lifter lever works in the channel of the frame extension 17a. The lifter lever 32 is connected by means of links 35 to the nut or collar 26.

Secured to a stationary part of the vehicle or door structure as, for instance, at the sill 36 adjacent the upper edge of the well 12 is a closing plate 37. When the pivoted panel 15 is in the plane of the window opening and ready to be lowered in the well 12, the shoe 22 will be parallel with the upper edge of this closing plate and free of the same so that the panel 15 may then be lowered.

In operation, assuming that the panel 15 is lowered within the well, the lifter mechanism will be operated and the lifter arm 28 will, through the lifting lever 32, slide the frame 17 upwardly out of the well and into registration with the window opening 11. Any tendency to swing the pivoted panel 15 about its pivots is resisted by reason of the fact that the panel 15 is confined between the spaced plates 23. However, as soon as the panel 15 has been completely raised into registration with the window opening, the panel clears the upper edges of the spaced plates 23 so that a continued movement of the lifter arm 28 will swing the lifting lever 32 about its pivot 33 and through the links 35 will impart a lifting movement to the collar 26 and by engagement of the blocks 25 with the grooves 24, a rotation of the shaft 21 and an adjustment of the panel 15 to the desired angular position.

During the first portion of the movement of the lifter mechanism to lower the frame 17, the panel 15 is moved from its angular position to a position in the plane of the frame 17 and thus clear of the closing plate 37 and a continued movement of the lifter mechanism in this direction then lowers the frame 17 and panel 15 into the well.

The shaft 21 and nut or collar 25—26 constitutes a spiral drive device operable by the window lifter mechanism for effecting an adjustment of the pivoted panel. It will be noted that the arrangement is such that this spiral drive device operates during the last part of the movement of the window lifter mechanism during the raising of the panel 15 and during the first part of the movement of the window lifter mechanism during the lowering of the panel. Of course it will be understood that by limiting the amount of movement imparted to the lifter mechanism the pivoted panel 15 may be angularly adjusted as desired or moved to closed position in the plane of the window opening without effecting any vertical sliding movement of the frame 17.

While this spiral drive device has been found in practice to be entirely satisfactory, the present invention contemplates any other means operable by the window lifter mechanism for effecting this angular adjustment of the panel 15.

The sliding panel 14 may be raised and lowered by means of any conventional or desired type of window lifter mechanism, the type herein shown comprising a lifter arm 38 having its pin or roller 39 engaging the usual retainer 40 which is secured to the glass support 41 of the glass panel 14. The reference character 42 indicates the lifter handle.

While the manner in which the pivoted panel 15 may be weatherproofed can be altered as found to be desirable or expedient, the edges of this panel are shown as being weatherproofed by weatherstripping 43 carried by the frame 17 and the complementary frame portion 17'.

With the herein described construction, it will be apparent that the sliding panel 14 may be raised and lowered independently of the pivoted panel 15 which can be adjusted to the desired angular position with reference to the window opening by the proper manipulation of the window lifter mechanism associated therewith. Moreover, if it is desired to completely open the window opening, after the panel 14 has been lowered by its window lifter mechanism the pivoted panel 15 may also likewise be lowered into the well 12.

While an operative embodiment of the invention has been illustrated and described somewhat in detail, it will be apparent to those skilled in this art that various changes, modifications and rearrangements may be resorted to without departing from the spirit and scope of this invention, and to this end reservation is made to make such changes as may come within the purview of the accompanying claims.

What I claim is my invention is:

1. In a ventilating window structure for vehicle bodies having a window opening, a frame slidable into and out of registration with the window opening, a panel pivotally mounted in said frame on substantially vertically arranged pivots located intermediate the vertical edges of said panel, said pivoted panel occupying a portion of said window opening, a sliding panel to the rear of said pivoted panel and occupying the rear part of the window opening to form with the pivoted panel a composite window opening closure, the adjacent portion of said frame forming a guide for one edge of said sliding panel, a window lifter mechanism for raising and lowering said frame, and means operated by said window lifter mechanism when said frame is in registration with the window opening for angularly adjusting said pivoted panel.

2. In a ventilating window structure for vehicle bodies having a window opening, a panel slidably mounted in the window opening, a panel mounted for pivotal movement in the opening on substantially vertically arranged pivots and cooperating with the first panel to close the window opening, a frame bar located between adjacent edges of the panels and mounted for sliding movement into and out of the window opening, said frame bar having a portion forming an abutment for the swinging edge of the pivoted panel and having another portion engageable with the adjacent edge of the first named panel, means for raising and lowering the first panel, and means for raising and lowering the pivoted panel.

3. In a ventilating window structure for vehicle bodies having a window opening, a panel slidably mounted in the window opening, a panel mounted for pivotal movement in the opening on substantially vertically arranged pivots and cooperating with the first panel to close the window opening, a slidably mounted frame for one of the panels having a frame bar located between adjacent edges of the panels, said frame bar having a portion forming an abutment for the swinging edge of the pivoted panel and having another portion engageable with the adjacent edge of the first named panel, means for raising and lowering the frame together with the panel therein, and means for raising and lowering the other panel.

4. In a ventilating window structure for vehicle bodies having a window opening, a panel slidably mounted in the window opening, a panel mounted for pivotal movement in the opening on substantially vertically arranged pivots and cooperating with the first panel to close the window opening, a frame bar located between adjacent edges of the panels and mounted for sliding movement into and out of the window opening, said frame bar having a portion forming an abutment for the swinging edge of the pivoted panel and having another portion engageable with the adjacent edge of the first named panel, means for raising and lowering the first panel, and means for raising and lowering the pivoted panel and for angularly adjusting the same when said pivoted panel is in registration with the window opening, the actuating means for one of the panels also operable to raise and lower the frame bar.

HOMER G. KELLOGG.